United States Patent
Chu et al.

(10) Patent No.: US 11,100,573 B1
(45) Date of Patent: Aug. 24, 2021

(54) CREDIT SCORE COHORT ANALYSIS ENGINE

(71) Applicants: Yantian Chu, Sunnyvale, CA (US); James Rodney Jennings, Mountain View, CA (US); Christian Anthony Rodriguez Mercado, Hayward, CA (US); Stefanos L. Missailidis, San Francisco, CA (US)

(72) Inventors: Yantian Chu, Sunnyvale, CA (US); James Rodney Jennings, Mountain View, CA (US); Christian Anthony Rodriguez Mercado, Hayward, CA (US); Stefanos L. Missailidis, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 227 days.

(21) Appl. No.: 15/908,777

(22) Filed: Feb. 28, 2018

(51) Int. Cl.
*G06Q 40/02* (2012.01)
*G06N 20/00* (2019.01)

(52) U.S. Cl.
CPC .......... *G06Q 40/025* (2013.01); *G06N 20/00* (2019.01)

(58) Field of Classification Search
CPC ............................. G06N 20/00; G06Q 40/025
USPC ......................................................... 705/38
See application file for complete search history.

(56) References Cited

U.S. PATENT DOCUMENTS

| | | | | |
|---|---|---|---|---|
| 8,078,524 | B2* | 12/2011 | Crawford | G06Q 20/10 705/35 |
| 8,417,715 | B1* | 4/2013 | Bruckhaus | G06Q 30/0202 707/758 |
| 2007/0038659 | A1* | 2/2007 | Datar | G06Q 30/02 |
| 2007/0112668 | A1* | 5/2007 | Celano | G06Q 40/025 705/38 |
| 2009/0171956 | A1* | 7/2009 | Gupta | G06F 16/35 |
| 2011/0238614 | A1* | 9/2011 | Yoon | G06N 20/00 706/52 |
| 2016/0203501 | A1* | 7/2016 | Pydynowski | G06Q 30/0204 705/7.33 |
| 2017/0032460 | A1* | 2/2017 | Szollar | G06Q 40/025 |
| 2018/0225756 | A1* | 8/2018 | Wasser | G06F 3/0412 |
| 2019/0035015 | A1* | 1/2019 | Yang | G06N 3/0481 |
| 2019/0228290 | A1* | 7/2019 | Ruiz | G06N 3/0427 |

\* cited by examiner

*Primary Examiner* — Ryan D Donlon
*Assistant Examiner* — Mark A Malkowski
(74) *Attorney, Agent, or Firm* — Ferguson Braswell Fraser Kubasta PC (57) ABSTRACT

A method for obtaining a comparison criterion selected by a first user. The method further includes comparing the comparison criterion of the first user to a second user to determine a similarity metric between the first user and the second user. The method further includes adjusting the learning algorithm to create a correlation between the comparison criterion of the first user and a second user to generate an adjusted learning algorithm. The method further includes selecting, a custom tip based on the correlation, a credit score of the first user, and a credit score of the second user. The method further includes the custom tip and a comparison of the credit score of the first user with the credit score of the second user based on the similarity metric.

18 Claims, 6 Drawing Sheets

CREDIT SCORE COHORT ANALYSIS ENGINE

BACKGROUND

Credit score comparisons are commonly found within financial management applications, such as personal financial management tools, credit card websites, tax programs, and budget programs. These applications typically provide a method for comparing the user's credit score to an average credit score of other users of the application. Each of the other users of the FMA is the user's cohort. The comparison fails to take into account comparing individuals with similar situations (e.g., age, income, investments, living situation, region of the country, or other lifestyle factors). In particular, the factors used to provide the comparison are very limited and the conclusions drawn from the comparison are not always relevant or apparent to the user.

SUMMARY

In general, in one aspect, embodiments relate to a method for obtaining, from a financial management application (FMA), a comparison criterion selected by a first user. The method further includes comparing, using a learning algorithm, the comparison criterion of the first user to a second user to determine a similarity metric between the first user and the second user. The method further includes adjusting, by a system processor, the learning algorithm to create a correlation between the comparison criterion of the first user and a second user to generate an adjusted learning algorithm. The method further includes selecting, using the adjusted learning algorithm, a custom tip based on the correlation, a credit score of the first user, and a credit score of the second user. The method further includes sending, as an image to a user interface of the FMA, the custom tip and a comparison of the credit score of the first user with the credit score of the second user based on the similarity metric.

In general, in one aspect, embodiments relate to a system to obtain, from a financial management application (FMA), a comparison criterion selected by a first user. The system further compares, using a learning algorithm, the comparison criterion of the first user to a second user to determine a similarity metric between the first user and the second user. The system further adjusts, by a system processor, the learning algorithm to create a correlation between the comparison criterion of the first user and a second user to generate an adjusted learning algorithm. The system further selects, using the adjusted learning algorithm, a custom tip based on the correlation, a credit score of the first user, and a credit score of the second user. The system further sends, as an image to a user interface of the FMA over the computer network, the custom tip and a comparison of the credit score of the first user with the credit score of the second user based on the similarity metric.

In general, in one aspect, embodiments relate to a non-transitory computer-readable storage medium for obtaining, from a financial management application (FMA), a comparison criterion selected by a first user, including computer readable program code embodied therein for receiving a request for application content. The non-transitory computer-readable program code is further for comparing, using a learning algorithm, the comparison criterion of the first user to a second user to determine a similarity metric between the first user and the second user, adjusting, by a system processor, the learning algorithm to create a correlation between the comparison criterion of the first user and a second user to generate an adjusted learning algorithm, selecting, using the adjusted learning algorithm, a custom tip based on the correlation, a credit score of the first user, and a credit score of the second user, and sending, as an image to a user interface of the FMA, the custom tip and a comparison of the credit score of the first user with the credit score of the second user based on the similarity metric.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve a method and system for providing a credit score comparison and a custom tip to the user as compared to a cohort (e.g., other users) of a financial management application (FMA). Many people are turning to FMAs to handle finances, such as budgeting and planning, as well as a tool to help prepare taxes. Applications, such as FMAs, have the capability of not only collecting data and learning about the user, but also collecting data about others using the application, such as a cohort. The FMA, in accordance with embodiments of the invention, is a massively multiuser application accessed online or on a computing device where data is collectively stored for all users anonymously (without personally identifiable attributes) and then used for analysis or other useful tasks. From this data, correlations can be made between the user and the other users of the application, such as a cohort. In particular, the applications may provide the user with his or her credit score and compare the user's credit score to the average credit score from a group of similar users. By providing the user's current credit score in comparison to similar users as well as providing helpful details about how the credit score was generated, users may be instructed (using customized tips) how to improve a credit score in view of the similar users.

Figure 1:
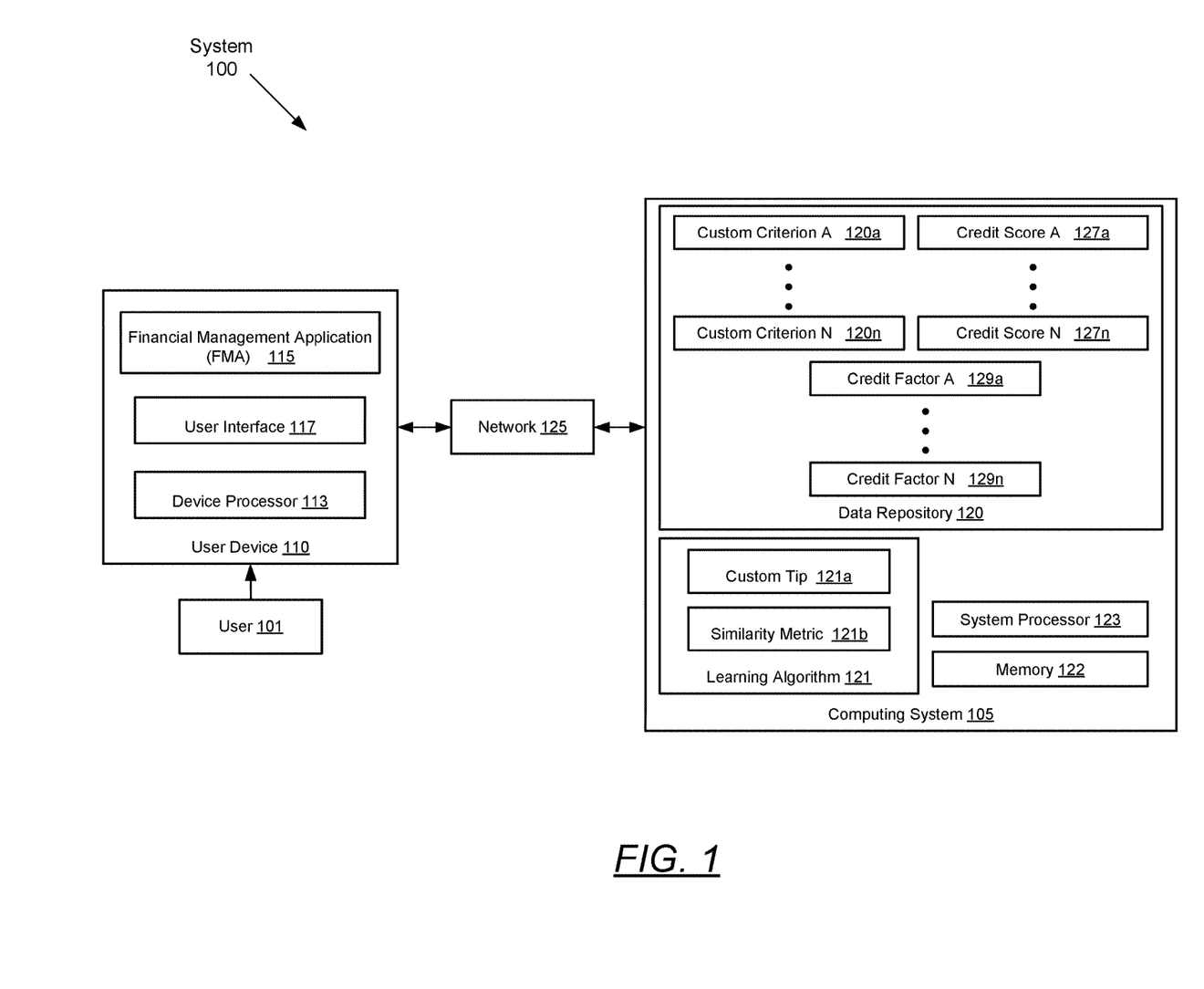
FIG. 1 shows a system for comparing credit scores in accordance with one or more embodiments.

Turning to FIG. 1, a system (100) for comparing credit scores, in accordance with embodiments, is shown. The system (100) includes a user (101), who accesses a Financial Management Application (FMA) (115) through a user device (110) by interacting with a user interface (117). The user device (110) also include a device processor (113) that includes functionality to allow the FMA (115) to execute on the user device (110).

In one or more embodiments, the user (101) is an individual or automated software that enters necessary user information into the FMA (115). Additionally or alternatively, the FMA (115) may automatically access the user information from user documents, such as tax forms, bills, or receipts, or download the user information from various websites (e.g., bank sites, investment sites, financing sites, etc.) or financial institutions. The information entered by the user (101) as well as any other information provided to the FMA (115) forms the basis for the custom criterion (120a, 102n) that is used by the FMA (115).

In one or more embodiments, a user device (110) is any device and/or any set of devices capable of electronically processing instructions and that includes at least the minimum processing power, memory, input and output device(s), network connectivity, and ability to process application content. Examples of the user device (110) include, but are not limited to a server, a virtual machine (VM), a desktop computer, a mobile device (e.g., laptop computer, smart phone, personal digital assistant, tablet computer, or other mobile device), and/or any other type of computing device.

Embodiments of the invention may be implemented on a computing system (105). Any combination of mobile, desktop, server, embedded, or other types of hardware may be used. For example, as shown in FIG. 1, the computing system (105) may include one or more system processor(s) (123), associated memory (122), one or more data repository(s) (120), and numerous other elements and functionalities. The computing system (105) may also include one or more input device(s) (not shown), such as a touchscreen, keyboard, mouse, microphone, touchpad, electronic pen, or any other type of input device. Further, the computing system (105) may include one or more output device(s) (not shown), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (105) may be connected to a network (125) via a network interface connection (not shown). The input and output device(s) may be locally or remotely (e.g., via the network (125)) connected to the system processor(s) (123), memory (122), and data repository(s) (120). Many different types of computing systems exist, and the aforementioned input and output device(s) may take other forms.

In one or more embodiments, a network (125) is used to provide interaction capability between the user device (110) and computing system (105). The network (125) may be a local area network (LAN), a wide area network (WAN) such as the Internet, mobile network, or any other type of network.

In one or more embodiments, the user device (110) contains a device processor (113), a financial management application (115), and a user interface (117). Each of these is described below.

In one or more embodiments, the device processor (113) contains instructions that enable the user device to perform the functions described in accordance with one or more embodiments. The device processor (113) may be an integrated circuit for processing instructions. For example, the device processor may be one or more cores, or micro-cores of a processor.

The FMA (115), in accordance with one or more embodiments, is a software application written in any programming language that includes instructions stored in any non-transitory computer readable medium. The instructions, when executed by one or more processors in a user device (110), enable the user device to perform the functions described in accordance with one or more embodiments. In one or more embodiments, the FMA (115) is capable of assisting the user (101) with the user's finances. For example, the FMA (115) may contain capability to track the user's spending habits, tax information, credit score, and any other financial information that is available.

The user interface (117), in accordance with one or more embodiments, is a touch screen, a monitor, or any other type of screen that can display information through a graphical user interface (GUI) and allow for user feedback to the FMA (115) on the user device (110) using the same hardware and GUI. For example, the user (101) accesses the FMA (115) through the user interface (117) to manage the user's financial standing, including a credit score (126A), which may be displayed alone or alongside the average credit score (e.g., 127n) for other users, such as a cohort, of the FMA (115).

In one or more embodiments, the computing system (105) contains a data repository (120), a learning algorithm (121), memory (122), and a system processor (123). Each of these components is described below. The computing system (105) is communicatively connected, either directly or indirectly, to the user device (110) via a network (125).

The data repository (120) stores the information from the user (101) that may be entered directly by the user (101), entered in an automated manner, or downloaded from a third-party source. The data repository may be a hard disk, an optical drive such as a compact disk (CD) drive or digital versatile disk (DVD) drive, a flash memory stick, etc. The custom criterion (120a, 102n) is stored in a data repository (120). In one or more embodiments, the information stored by the user in the data repository (120) becomes a comparison criterion (120a). Further, the data repository (120) may include multiple different storage units and/or devices. The multiple different storage units and/or devices may or may not be of the same type or located at the same physical site.

In one or more embodiments, learning algorithm (121) includes capability for determining the similarity metric (121b) and custom tip (121a). The learning algorithm (121) is any known algorithm that is capable of performing a calculation between known variables to determine an outcome based on instructions stored in the system processor (123). The results of the learning algorithm are sent through the computing system (105) to the user device (110) via the network (125) to be displayed on the user interface (117).

In one or more embodiments, memory (122) is stored on the computing system (105). The memory may be random access memory (RAM), cache memory, flash memory, etc.

The system processor (123), in one or more embodiments, may be an integrated circuit for processing instructions. For example, the system processor may be one or more cores, or micro-cores of a processor.

Within the data repository (120), the comparison criterion (120a, 120n), in accordance with one or more embodiments, may be information based on age, location, home ownership status, mortgage payment, marital status, number of dependents, car loan status, and any other status that is related to one's finances. The data repository (120) also stores credit factors (129a, 129n) of the user and the credit scores (126A, 127n), which are calculated by a third-party credit services, such as Equifax, Transunion, or Experian. The credit factors (129a, 129n) may include the user having a late or delinquent payment record, one or more bankruptcies, public notices or records (such as liens, judgments, or lawsuits), income to debt ratio, number of credit cards, etc.

The learning algorithm (121), in accordance with one or more embodiments, is able to calculate a similarity metric (121b) between the user (101) and other users, such as a cohort, who also use the FMA (115). The similarity metric (121b) determines which users closely align to each other based on the comparison criterion (120a, 120n) of each user. For example, the similarity metric (121b) would be higher when comparing two users around 25 years old, married, with no kids, rather than comparing one user around 35 years old, married, with multiple kids and a house with another user around 25 years old, married, who rents and has no kids. While the example shows how the similarity metric (121b) is affected by the comparison criterion (120a) of the users (101); the invention should not be limited by this one example as many examples not shown here may be used to show how the similarity metric (121b) changes based on the comparison criterion (120a).

In one or more embodiments, the learning algorithm (121) is used across the FMA (115) by all of users and not only one user (e.g., user (101)). Accordingly, the learning algorithm (121) is used across multiple user devices (110) and allows the algorithm to "learn" not only about other users, but which comparison criterion (120a, 120n) help improve the similarity metric (121b). The refining of the similarity metric (121b) provides users with a more accurate representation of a group of similar people and also provides a better understanding regarding what can be done to help improve one's credit score (126A, 127n).

In one or more embodiments, the learning algorithm (121) is also involved with creating a custom tip (121a) for the user (101). The custom tip (121a), in accordance with one or more embodiments, includes advice related to how a user (101) can help improve his/her credit score based on the specific comparison criterion (120a) and the specific credit factors (129a) of the user (101). Based on the comparison criterion (102a), the user is matched with other users who rent, but are looking to purchase a home. For this group of users, examples of the custom tip (121a) would be adjusting behavior based on such credit factors as the amount of money saved, the number of credit cards, the average length of credit held, and the number of credit inquiries. More specifically, for a person renting and hoping to buy a house, the custom tip compared to others in a similar situation would be to cancel the credit cards held for the least amount of time, keep the older credit cards, maximize savings by setting up a direct deposit for a portion of the user's paycheck directly to a savings account, and don't attempt to open any new credit cards until after the user purchases a home.

Figure 6A:
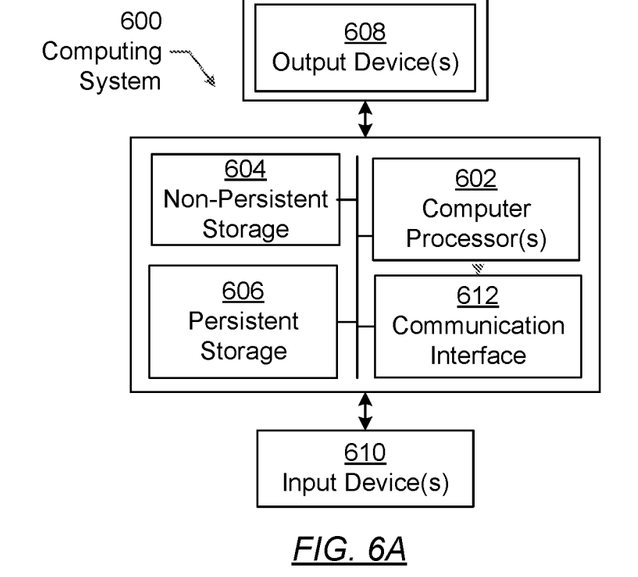
FIGS. 6A and 6B show a computing system in accordance with one or more embodiments.
Figure 6B:
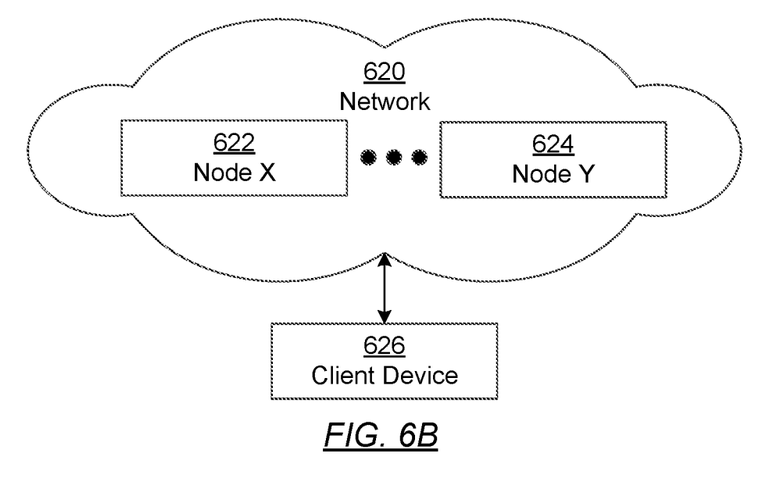

Embodiments may be implemented on one or more computing systems that may be similar to the computing system introduced in FIGS. 6A and 6B. While FIG. 1 shows a configuration of components, other configurations may be used without departing from the scope of the invention. For example, various components may be combined to create a single component. As another example, the functionality performed by a single component may be performed by two or more components that may be communicatively connected using a network connection.

Figure 2:
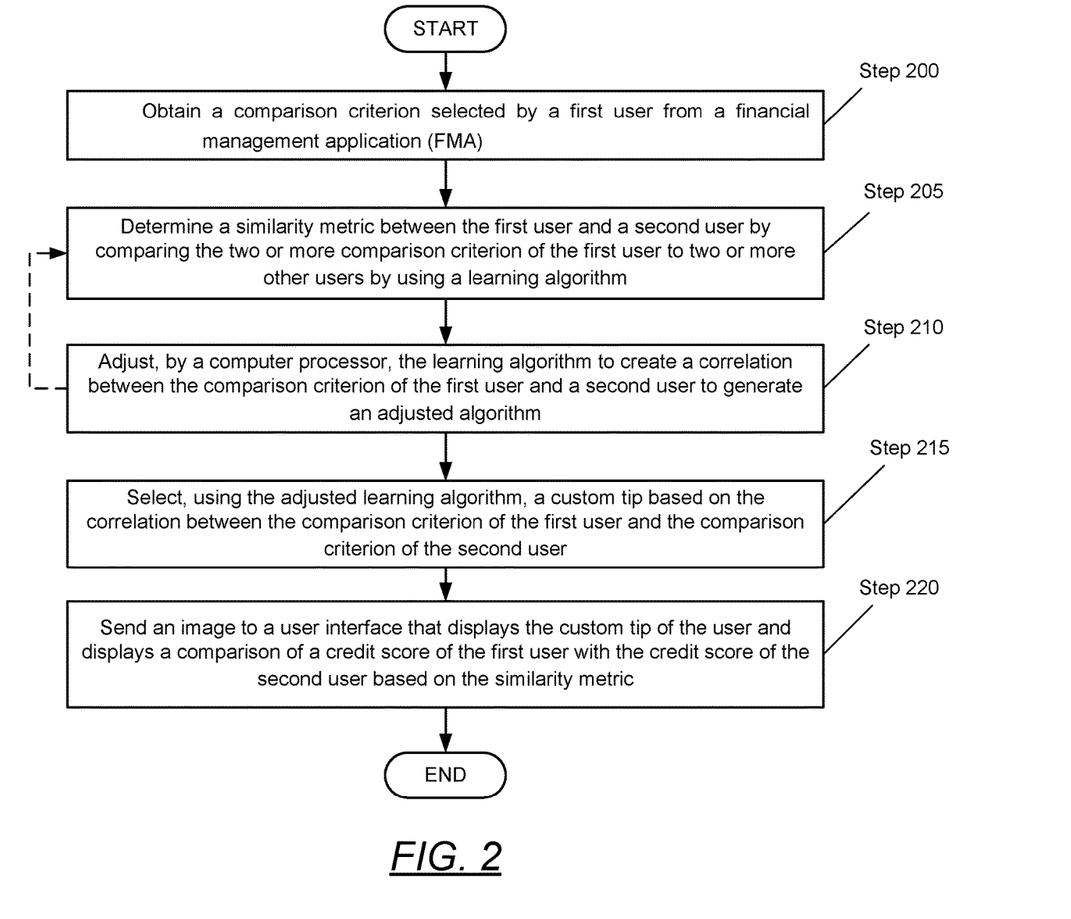
FIG. 2 shows a flowchart in accordance with one or more embodiments.

FIG. 2 shows flowcharts in accordance with one or more embodiments. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

Turning to FIG. 2, a method for comparing credit scores is shown. The method may be executed on a user device by the user. Steps for the method are described with reference to the exemplary illustrations show in FIGS. 4, 5, and 6.

Figure 4:
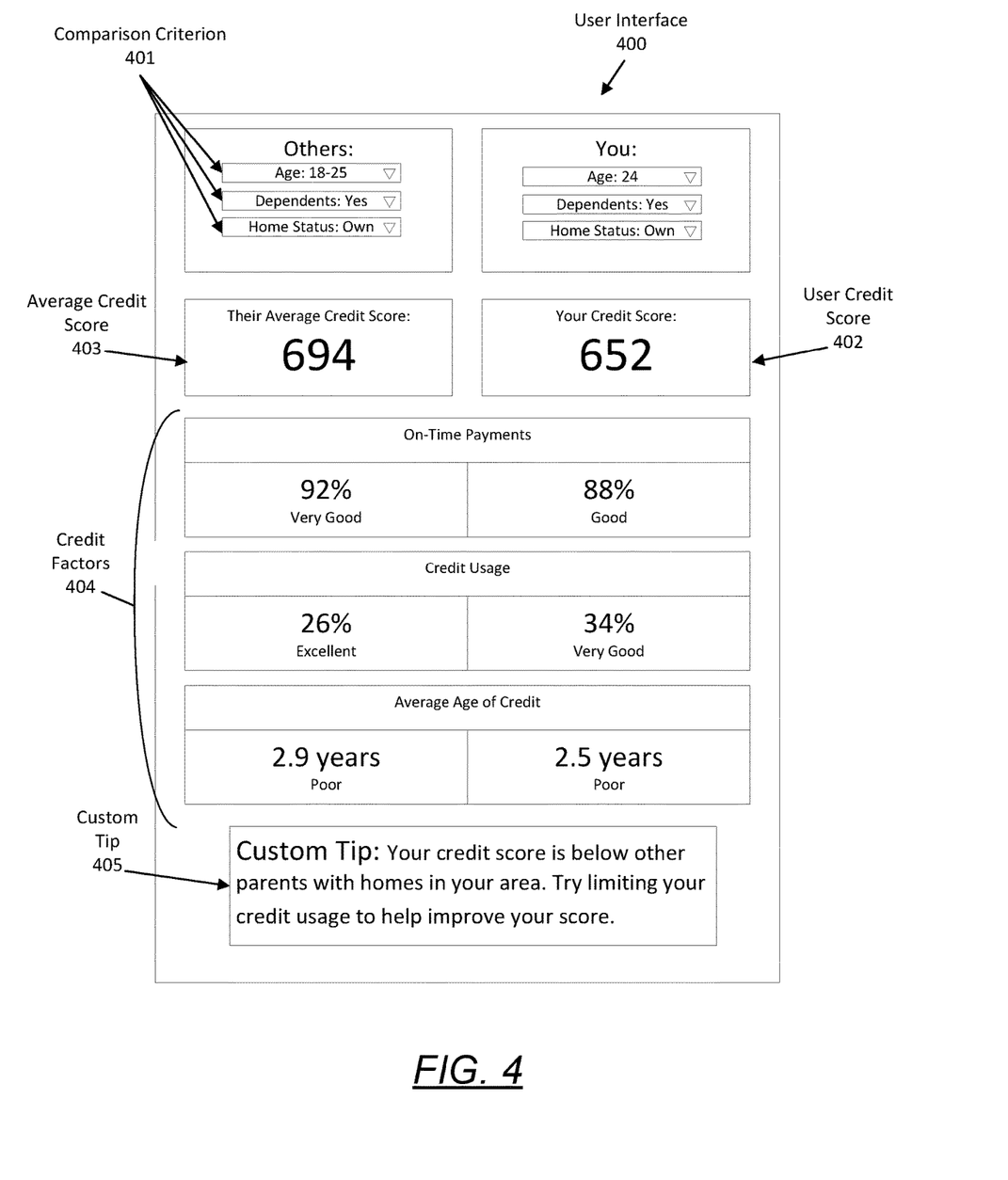

In Step 200, a comparison criterion is obtained through the FMA. The user selects which comparison criterion are to be used through a user interface. In one or more embodiments, the comparison criterion is selected through a drop-down menu, a box list, or any other method known for list selection. Although the embodiment shown in FIG. 4 shows three comparison criterion, one familiar in the art can appreciate that the number of comparison criterion selected may any number (e.g., more or less than three).

In one or more embodiments, the list of comparison criterion is a set list shown by the FMA. In another embodiment, the list of comparison criterion expands to include more comparison criterion based on user feedback or other events. For example, the list may be expanded to include an option for selecting a comparison criterion based on a recent natural disaster so that the user can compare their financial situation to those who have also been affected by a similar natural disaster. The example described is merely exemplary, and the list should not be limited by this example.

In Step 205, a similarity metric is determined between multiple users (such as a first user and a second user) by using a learning algorithm. In one or more embodiments, the similarity metric is between a first user and multiple users based on the comparison criterion selected by the first user. The similarity metric changes based on the selection of the comparison criterion by the first user. For example, the similarity metric essentially matches the first user with a group of people based on age, location, and home owner status, but also matches the first user with a different group of people based on age, dependents, and location.

In Step 210, an adjustment is made to the learning algorithm. The learning algorithm is an algorithm that calculates the similarity metric between multiple users. In one or more embodiments, the learning algorithm further adjust itself to provide a more accurate representation of similar users as more users use the FMA. The further adjusting is shown by the arrow going from Step 205 to Step 210. By optionally adjusting the learning algorithm (by returning to Step 205) after each use by the first user and all other users of the FMA improves the results.

In Step 215, the adjusted learning algorithm selects a custom tip for the user based on the correlation between the first and second user. In one or more embodiments, the custom tip is centered around the comparison criterion selected by the first user. For example, the custom tip may provide financial advice related to improving your credit score to become a home owner. The custom tip can change based on the custom criterion selected by the first user. In another embodiment, the custom tip is related to the credit factors used to determine a user's credit score. For example, the custom tip could provide advice about paying credit cards on time or which credit cards to cancel or open.

In Step 220, an image is sent to the user interface that displays the custom tip as well as a comparison of credit scores between the first user and multiple other users. In one or more embodiments, the image also contains the credit factors of the first user compared to the average of the credit factors of other users based on the similarity metric. All of the credit factors may be listed, or only a portion could be listed, as determined by the adjusted learning algorithm. For example, the adjust learning algorithm may determine which credit factors have the greatest disparity between the first user and other users. In this example, the custom tip may be focused on only the credit factors that are displayed as opposed to all of the credit factors.

In one or more embodiments, the credit factors could be shown as a list (e.g., a limited list) to allow the first user to determine which credit factors are shown. In this embodiment, the list allows the first user the ability to choose what credit factors are shown as they see fit. The list format also allows the user to still see a full comparison with the other users while saving screen space and removing unnecessary information from the user interface.

Figure 3:
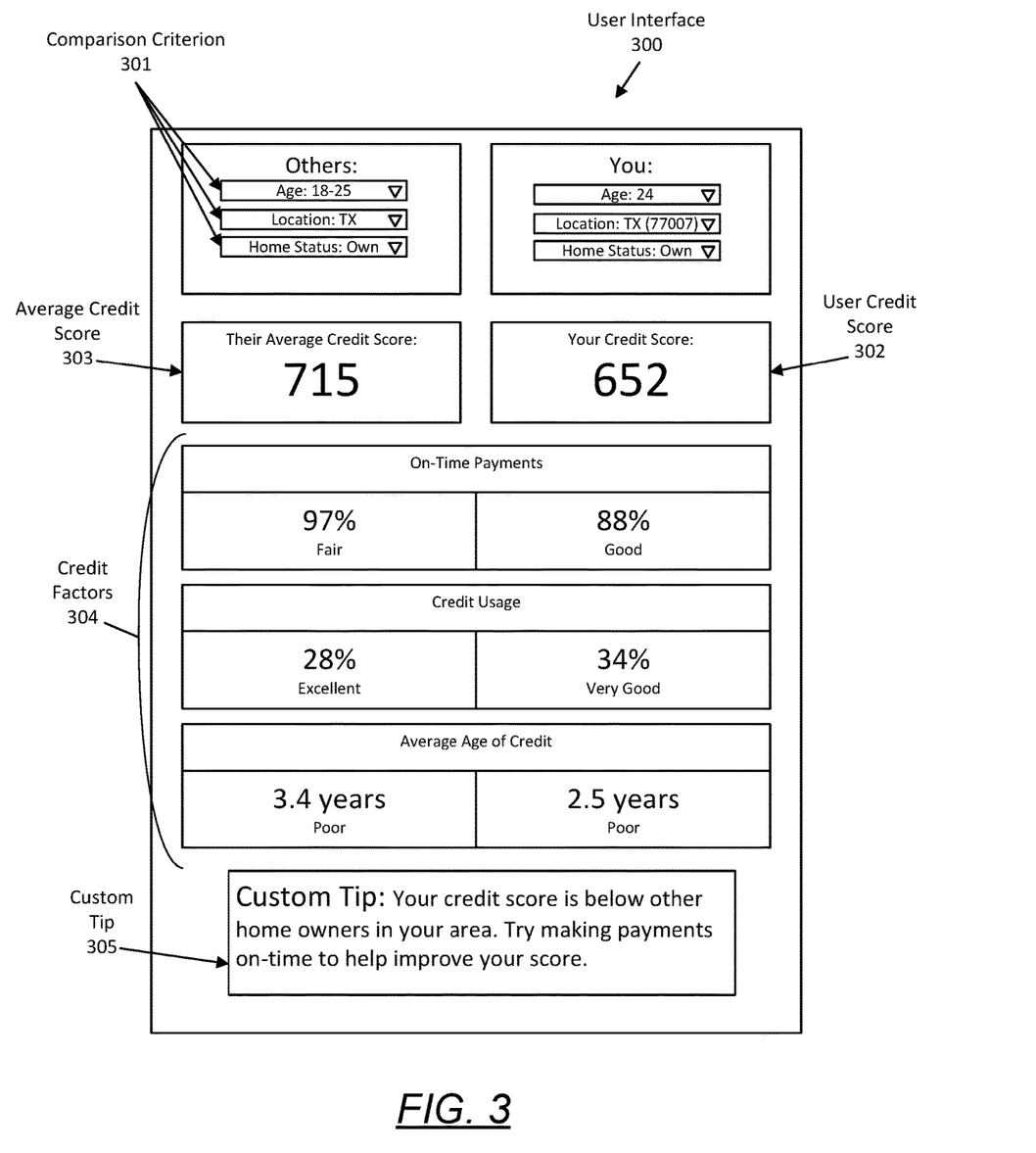
FIGS. 3, 4, and 5 show an example in accordance with one or more embodiments.

Turning to FIG. 3, an example is shown of the user interface (300) and how the comparison criterion (301) appear within the user interface of the FMA residing on the user device. The following example is for explanatory purposes only and not intended to limit the scope of the invention. The example shows a general layout of the user interface (300), which includes: the comparison criterion (301), the user's credit score (302) and the average credit scores of the other users (303), credit factors (304), and the custom tip (305). As shown in FIG. 2, the custom criterion (301) is selected by the first user to display Age, Location, and Home Status. The user, in this case, is comparing how the user credit score (302) stacks up against other people in the area that also own a home. Three credit factors (304) are displayed along with the credit score of both the first user and the other users.

For this example, a custom tip (305) is provided. The custom tip (305) is focused on the "home owner" comparison criterion (301) and one of the credit factors (304). The learning algorithm has determined that based on all the credit factors (304) and the credit scores (302, 303) provided, the user would be best served improving his or her credit score by being more proactive about making on-time payments.

FIG. 4 shows another example showing the interface (400) that is similar to FIG. 3. In this example, the user has changed one of the comparison criterion (401) from "location" to "dependents". Changing this comparison criterion (401) has affected the average credit score (403) and credit factors of the other users (404). These changes produced a new custom tip (405) for the user indicating that the user should focus more on limiting credit usage. As the comparison criterion (401) changes, the learning algorithm will continually update the custom tip (405) to produce information that will best suit the first user in improving his or her credit score.

Figure 5:
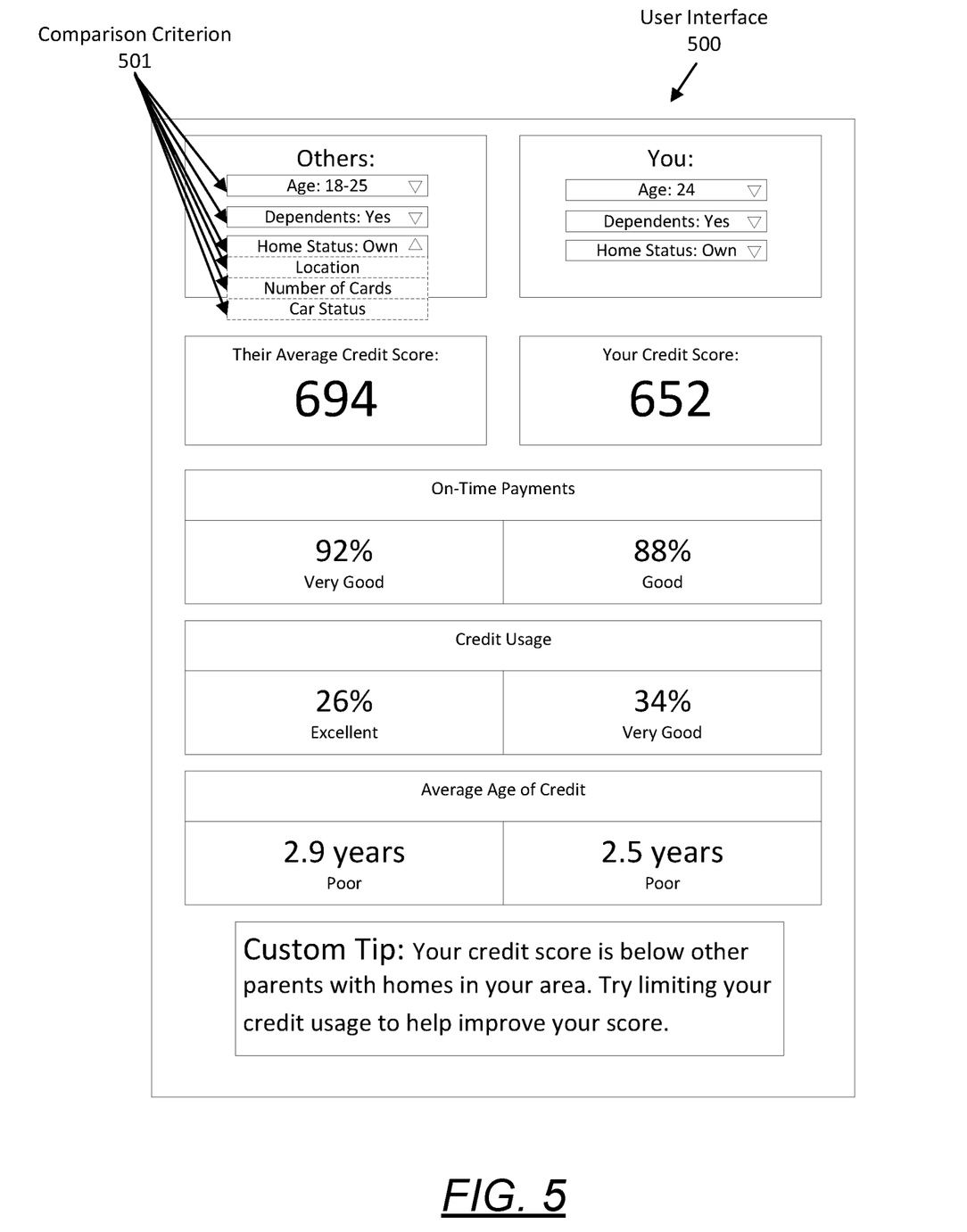

Turning to FIG. 5, an example is shown to portray how the user interacts with the user interface (500). The comparison criterion (501) under "Others" may be changed with a list format. As seen, many examples are offered for the user to pick from besides "Age" and "Location". The choices provide the user with a number of different options regarding who he or she wants to be compared against when comparing credit scores. This flexibility allows the user to help analyze his or her financial situation based on their current needs at the time.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (600) in FIG. 6A may be connected to or be a part of a network. For example, as shown in FIG. 6B, the network (620) may include multiple nodes (e.g., node X (722), node Y (724)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below. Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6A, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A—B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   displaying, in a graphical user interface (GUI) of a financial management application (FMA), a GUI widget for custom criteria;
   receiving, in the GUI widget of the FMA, a selection of a first comparison criterion from a first user, wherein a first panel in the GUI is updated with a first value corresponding to the first user in response to the selection, and wherein a second panel in the GUI is updated with a second value corresponding to a set of second users in response to the selection;
   generating, using a learning algorithm using the first comparison criterion, a first similarity metric between the first user and the set of second users;
   adjusting, by a system processor, the learning algorithm to create a first correlation between the first comparison criterion of the first user and the set of second users to generate a first adjusted learning algorithm;
   selecting, using the first adjusted learning algorithm, a first custom tip based on the first correlation, a credit score of the first user, and a credit score of the set of second users;
   displaying, as a first image in the GUI of the FMA, the first custom tip and a comparison of the credit score of the first user with the credit score of the set of second users based on the first similarity metric;
   receiving, after displaying the first image, and in the GUI widget of the FMA, an updated selection of a second comparison criterion from the first user, wherein the first panel in the GUI is updated with a third value corresponding to the first user in response to the updated selection, and wherein a second panel in the GUI is updated with a fourth value corresponding to a set of third users in response to the updated selection;
   generating, using the first adjusted learning algorithm using the second comparison criterion instead of the first comparison criterion, a second similarity metric between the first user and the set of third users;
   adjusting, by the system processor, the learning algorithm to create a second correlation between the second comparison criterion of the first user and the third user to generate a second adjusted learning algorithm;
   selecting, using the second adjusted learning algorithm, a second custom tip based on the second correlation, the credit score of the first user, and a credit score of the third user; and
   displaying, as a second image in the GUI of the FMA, the second custom tip and a comparison of the credit score of the first user with the credit score of the third user based on the similarity metric.

2. The method of claim 1, further comprising:
   advising the first user to adjust the credit score of the first user based on credit factors determined by the second adjusted learning algorithm.

3. The method of claim 2, further comprising:
   calculating a disparity between a credit factor of the first user and a credit factor of the third user;
   determining the credit factors to display based on a greatest disparity between the credit factor of the first user and the credit factor of the third user; and
   selecting the second custom tip based on the displayed credit factors.

4. The method of claim 1, further comprising:
   displaying, as the first image in the GUI of the FMA, one or more credit factors from the credit score to display based on the first adjusted learning algorithm and the first custom tip; and
   displaying, as the first image in the GUI of the FMA, a limited list of the credit factors for display and selection by the first user.

5. The method of claim 1, wherein the learning algorithm is adjusted by input from other users of the FMA.

6. The method of claim 1, wherein the first custom tip comprises advice to adjust the credit score of the first user to match the credit score of the set of second users based on the first comparison criterion.

7. A system comprising:
   a computer network;
   a memory; and
   a system processor configured to execute software instructions stored in memory, the software instructions comprising functionality to:
   display, in a graphical user interface (GUI) of a financial management application (FMA), a GUI widget for custom criteria;
   receive, in the GUI widget of the FMA, a selection of a first comparison criterion from a first user, wherein a first panel in the GUI is updated with a first value corresponding to the first user in response to the selection, and wherein a second panel in the GUI is updated with a second value corresponding to a set of second users in response to the selection;
   generate, using a learning algorithm using the first comparison criterion, a first similarity metric between the first user and the set of second users;
   adjust, by a system processor, the learning algorithm to create a first correlation between the first comparison criterion of the first user and the set of second users to generate a first adjusted learning algorithm;
   select, using the first adjusted learning algorithm, a first custom tip based on the first correlation, a credit score of the first user, and a credit score of the set of second users;
   display, as a first image in the GUI of the FMA over the computer network, the first custom tip and a comparison of the credit score of the first user with the credit score of the set of second users based on the first similarity metric;
   receive, after displaying the first image, and in the GUI widget of the FMA, an updated selection of a second comparison criterion from the first user, wherein the first panel in the GUI is updated with a third value corresponding to the first user in response to the updated selection, and wherein a second panel in the GUI is updated with a fourth value corresponding to a set of third users in response to the updated selection;
   generate, using the first adjusted learning algorithm using the second comparison criterion instead of the first comparison criterion, a second similarity metric between the first user and the set of third users;
   adjust, by the system processor, the learning algorithm to create a second correlation between the second comparison criterion of the first user and the third user to generate a second adjusted learning algorithm;

select, using the second adjusted learning algorithm, a second custom tip based on the second correlation, the credit score of the first user, and a credit score of the third user; and display, as a second image in the GUI of the FMA, the second custom tip and a comparison of the credit score of the first user with the credit score of the third user based on the similarity metric.

8. The system of claim 7, further comprising software instructions comprising functionality to:

advise the first user to adjust the credit score of the first user based on credit factors determined by the second adjusted learning algorithm.

9. The system of claim 8, further comprising software instructions comprising functionality to:

calculate a disparity between a credit factor of the first user and a credit factor of the third user;

determine the credit factors to display based on a greatest disparity between the credit factor of the first user and the credit factor of the third user; and select the second custom tip based on the displayed credit factors.

10. The system of claim 7, further comprising software instructions comprising functionality to:

display, as the first image in the GUI of the FMA, one or more credit factors from the credit score to display based on the first adjusted learning algorithm and the first custom tip; and display, as the first image in the GUI of the FMA, a limited list of the credit factors for display and selection by the first user.

11. The system of claim 7, wherein the learning algorithm is adjusted by input from other users of the FMA.

12. The system of claim 7, wherein the first custom tip comprises advice to adjust the credit score of the first user to match the credit score of the set of second users based on the selected comparison criterion.

13. A non-transitory computer-readable storage medium storing instructions configured to execute on a processor, the instructions comprising functionality to perform:

displaying, in a graphical user interface (GUI) of a financial management application (FMA), a GUI widget for custom criteria;

receiving, in the GUI widget of the FMA, a selection of a first comparison criterion from a first user, wherein a first panel in the GUI is updated with a first value corresponding to the first user in response to the selection, and wherein a second panel in the GUI is updated with a second value corresponding to a set of second users in response to the selection;

generating, using a learning algorithm using the first comparison criterion, a first similarity metric between the first user and a set of second users;

adjusting, by a system processor, the learning algorithm to create a first correlation between the first comparison criterion of the first user and the set of second users to generate a first adjusted learning algorithm;

selecting, using the first adjusted learning algorithm, a first custom tip based on the first correlation, a credit score of the first user, and a credit score of the set of second users;

displaying, as a first image in the GUI of the FMA, the first custom tip and a comparison of the credit score of the first user with the credit score of the set of second users based on the first similarity metric;

receiving, after displaying the first image, and in the GUI widget of the FMA, an updated selection of a second comparison criterion from the first user, wherein the first panel in the GUI is updated with a third value corresponding to the first user in response to the updated selection, and wherein a second panel in the GUI is updated with a fourth value corresponding to a set of third users in response to the updated selection;

generating, using the first adjusted learning algorithm applying the second comparison criterion instead of the first comparison criterion, a second similarity metric between the first user and the set of third users;

adjusting, by the system processor, the learning algorithm to create a second correlation between the second comparison criterion of the first user and the third user to generate a second adjusted learning algorithm;

selecting, using the second adjusted learning algorithm, a second custom tip based on the second correlation, the credit score of the first user, and a credit score of the third user; and displaying, as a second image in the GUI of the FMA, the second custom tip and a comparison of the credit score of the first user with the credit score of the third user based on the similarity metric.

14. The non-transitory computer-readable storage medium of claim 13, further comprising functionality to perform:

advising the first user to adjust the credit score of the first user based on credit factors determined by the second adjusted learning algorithm.

15. The non-transitory computer-readable storage medium of claim 14, further comprising functionality to perform:

calculating a disparity between a credit factor of the first user and a credit factor of the third user;

determining the credit factors to display based on a greatest disparity between the credit factor of the first user and the credit factor of the third user; and selecting the second custom tip based on the displayed credit factors.

16. The non-transitory computer-readable storage medium of claim 13, further comprising functionality to perform:

displaying, as the first image in the GUI of the FMA, one or more credit factors from the credit score to display based on the first adjusted learning algorithm and the first custom tip; and displaying, as the first image in the GUI of the FMA, a limited list of the credit factors for display and selection by the first user.

17. The non-transitory computer-readable storage medium of claim 13, wherein the learning algorithm is adjusted by input from other users of the FMA.

18. The non-transitory computer-readable storage medium of claim 13, wherein the first custom tip comprises advice to adjust the credit score of the first user to match the credit score of the set of second users based on the first comparison criterion.

* * * * *